(12) United States Patent
Dubourg et al.

(10) Patent No.: US 8,125,352 B2
(45) Date of Patent: Feb. 28, 2012

(54) GUIDING AND TAXIING ASSISTANCE OPTOELECTRONIC DEVICE FOR AN AIRCRAFT HAVING A DEDICATED SYMBOLOGY

(75) Inventors: Bernard Dubourg, Le Haillan (FR); François Michel, Saint Medard En Jalles (FR)

(73) Assignee: Thales (FR)

( * ) Notice: Subject to any disclaimer, the term of this patent is extended or adjusted under 35 U.S.C. 154(b) by 328 days.

(21) Appl. No.: 12/443,727

(22) PCT Filed: Oct. 9, 2007

(86) PCT No.: PCT/EP2007/060722
§ 371 (c)(1),
(2), (4) Date: Apr. 9, 2009

(87) PCT Pub. No.: WO2008/043763
PCT Pub. Date: Apr. 17, 2008

(65) Prior Publication Data
US 2010/0039295 A1    Feb. 18, 2010

(30) Foreign Application Priority Data
Oct. 10, 2006    (FR) ...................................... 06 08869

(51) Int. Cl.
*G01C 21/00* (2006.01)
(52) U.S. Cl. ........ 340/980; 340/972; 340/973; 340/974; 340/958; 340/947; 340/948; 701/3; 701/14; 701/16; 701/120
(58) Field of Classification Search ................. 340/980, 340/972, 973, 974, 958, 947, 948; 701/3, 701/14, 16, 120; 348/15
See application file for complete search history.

(56) References Cited

U.S. PATENT DOCUMENTS 6,411,890 B1    6/2002    Zimmerman
6,571,166 B1    5/2003    Johnson et al.
(Continued)

FOREIGN PATENT DOCUMENTS

FR    2 888 342    8/2007
(Continued)

OTHER PUBLICATIONS

RTCA DO272/EUROCAE ED99, "Users Requirements for Aerodrome Mapping Information", Oct. 2005, Paris, France, pp. 1-125, www.eurocae.org.

*Primary Examiner* — Tai T Nguyen
(74) *Attorney, Agent, or Firm* — Lowe Hauptman Ham & Berner, LLP

(57) ABSTRACT

The invention pertains to optoelectronic devices for aiding the guidance and taxiing of aircraft, comprising a so-called head-up collimator allowing the presentation of information in the pilot's visual field. It applies notably to large-size civil aircraft of the Boeing 747 or Airbus A380 type. The optoelectronic device comprises means for calculating a deviation factor for the actual trajectory of said aircraft relative to a theoretical trajectory on said traffic way, means for generating symbols and at least one head-up collimator comprising means for displaying and superimposing said symbols on the outside landscape. The deviation factor is calculated on the basis of an angle (PÂ'G) and that the means for generating symbols generate a symbol representing said deviation factor, so as to be superimposed on said traffic way.

20 Claims, 5 Drawing Sheets

U.S. PATENT DOCUMENTS

| | | | |
|---|---|---|---|
| 6,731,226 B2 * | 5/2004 | Walter | 340/972 |
| 7,382,284 B1 * | 6/2008 | Armstrong et al. | 340/958 |
| 2004/0056952 A1 | 3/2004 | Konya | |
| 2004/0059497 A1 | 3/2004 | Sankrithi | |
| 2007/0168111 A1 | 7/2007 | Dubourg | |
| 2008/0191903 A1 | 8/2008 | Dubourg et al. | |
| 2008/0270784 A1 | 10/2008 | Bonnet et al. | |
| 2009/0018713 A1 | 1/2009 | Coulmeau et al. | |

FOREIGN PATENT DOCUMENTS

| | | |
|---|---|---|
| WO | WO 9714114 | 4/1997 |
| WO | WO 9904304 | 1/1999 |

* cited by examiner

GUIDING AND TAXIING ASSISTANCE OPTOELECTRONIC DEVICE FOR AN AIRCRAFT HAVING A DEDICATED SYMBOLOGY

CROSS-REFERENCE TO RELATED APPLICATIONS

The present Application is based on International Application No. PCT/EP2007/060722, filed on Oct. 9, 2007, which in turn corresponds to French Application No. 0608869, filed on Oct. 10, 2006, and priority is hereby claimed under 35 USC §119 based on these applications. Each of these applications are hereby incorporated by reference in their entirety into the present application.

TECHNICAL FIELD

The invention pertains to optoelectronic devices for aiding the guidance and taxiing of aircraft, comprising a so-called head-up collimator allowing the presentation of information in the pilot's visual field. It applies notably to large-size civil aircraft of the Boeing 747 or Airbus A380 type.

BACKGROUND OF THE INVENTION

It is important that aircraft ground taxiing phases in an airport can take place in complete safety, whatever the density of the air traffic or the visibility conditions. Aircraft landing gear often has a significant footprint and occupies an appreciable part of the width of the traffic ways. For example, the width of the landing gear of an Airbus A380 exceeds 14 meters. One of the major objectives for ensuring safety is that, during taxiing, the whole of the landing gear remains entirely on the traffic way so as to prevent the aircraft from approaching too close to obstacles in proximity to the traffic way or the landing gear from leaving the runway.

One of the tricky points of taxiing is the negotiating of turns. Specifically, as illustrated in FIG. 1, in an airplane 11, the pilot 10 is situated at a height H of several meters above the ground. Therefore, a non-visibility zone 13 is significant below the craft. Thus, in an Airbus A380, the pilot is placed 7 meters above the ground and the non-visibility zone 13 shaded in FIG. 1 extends over 25 meters. Moreover, the large distance separating the main landing gear and the nose wheel 12 does not facilitate maneuvers. In an Airbus A380, the latter distance reaches 30 meters.

On modern aircraft, to ensure the airport navigation function, there exist two types of systems for aiding traffic flow on the ground. These are:
  A system for aiding navigation enabling the pilot:
  on the one hand, to ascertain the position of the aircraft in the airport at any moment;
  on the other hand, to indicate to him which path to follow to get from one point to another on the airport.
  Generally the useful information is presented on a so-called head-down instrument panel visualization. This information comprises:
    a mobile electronic map of the airport;
    the position of the aircraft on the airport maneuvering area;
    the trajectory to be followed and the stopping points, the latter correspond to the taxiing authorizations provided by the ground control.
  A system for aiding taxiing enabling the pilot to follow, as closely as possible, the directive trajectory coming from the control.

In the latter case, useful information is presented on a head-up collimator also called an HUD, the acronym standing for Head-Up Display. A head-up collimator conventionally comprises a source of images generating a symbology, a collimation optic and an optical combiner placed in the pilot's visual field. The collimator thus gives a virtual image at infinity of the symbology superimposed on the outside landscape.

The symbology gives information about the trajectory to be followed and a certain number of directives. It is generated by a computer dedicated to the collimator. In the case of the system for aiding taxiing, the information is provided to the computer of the collimator by:
  The main navigation system, notably in respect of the information regarding heading, ground speed and position;
  The airport navigation computer, based on:
    the traffic flow directives provided by the air traffic controller, a series of traffic way segments that must be followed by the airplane during the taxiing phase, and
    Information contained in a database relating to the airport platform on which the airplane is situated. There exist three categories of database giving the description of airports, called "Coarse", "Medium" and "Fine", defined in the document RTCA D0272/EUROCAE ED99, entitled "Users Requirements for Aerodrome Mapping Information". For this type of application, the databases used are of the "Fine" category.

The capacity for global monitoring of the situation of the aircraft and the precision of the maneuvers to be performed manually depend directly on the characteristics and the ergonomics of the symbols presented to the pilot, through the HUD.

Conventionally, the symbols displayed in a head-up collimator are separated into two principal categories:
  so-called compliant or 3D symbols which give a better perception of the environment of the aircraft. These symbols are particularly useful in the event of degraded visibility, for example for night traffic or in poor meteorological conditions. The virtual image provided by the collimator is superimposed on the outside elements with which they are associated, such as the horizon line, for example. In the case of taxiing aid, the symbols presented to the pilot are essentially symbols associated with the traffic way on which the aircraft is situated, the guide line painted on the traffic way is an example.
  so-called non-compliant symbols also termed 2D which provide the pilot with navigation information which is, for example:
    the final destination of the route;
    the next stopping point called the "limit clearance";
    the estimated time or the distance from the aircraft up to the final route point;
    the changes of direction to be performed;
    the ground speed of the aircraft;
    the value of the magnetic heading.

FIG. 2 represents an example of symbols for aiding taxiing, according to the prior art, when the aircraft is tackling a turn. The symbology has been simplified and only the elements necessary for the invention have been retained. The thick lined frame of FIG. 2 and of FIG. 7 represents the angular limits of the optical combiner. This symbology comprises:
  A compliant representation in 3D in which the symbols presented are superimposed on the outside elements that they represent. These symbols are:

Traffic way axial marks 22 of rectangular shape. These rectangles are represented in perspective, their orientation and their size depending on their position with respect to the aircraft;

Traffic way lateral safety marks 21, of circular shape and which appear in the form of ellipses in FIG. 2;

The horizon line 20;

A non-compliant representation in 2D. By way of example, a change of direction 23 is represented. This change of direction is symbolized by the text "TURN" followed by the indication of the number of meters to be covered before the next turn of the aircraft. In the example of FIG. 2, the distance remaining to be covered is 91 meters.

This representation is appropriate as long as the craft is situated at the entry to the turn or as long as the visibility conditions are good. However, when the craft is in the middle of a turn, this representation becomes insufficient. As seen in FIG. 3a, it is entirely possible that in the middle of a turn 32, having regard to the non-visibility zone 31 represented by the shaded zone and situated in front of the craft 30, the symbology displayed no longer comprises any utilizable lateral safety mark. If, on the other hand, the visibility is reduced, the pilot is then totally devoid of information and of visual reference tags.

The patent, with filing number 05 07323, proposes an improvement of the symbology of FIG. 2, integrating notably symbols, representing studs of cylindrical form of variable height, situated outside the turns. Advantageously the height of the studs gives the pilot a representation of the situation of the aircraft in the turn.

Nevertheless, content of the pilot's restricted field in aircraft of the A380 type, or equivalent wide-body craft, and of the severe climatic conditions which may be detrimental to visibility, notably in turns, the pilot does not always have a simple criterion relating to the deviation of his actual trajectory with respect to the theoretical trajectory that he ought to follow. The symbology of the elements of the runway becomes insufficient.

SUMMARY OF THE INVENTION

The invention lies within the framework of this function for aiding taxiing and affords the pilot a simple criterion relating to the deviation of the actual trajectory of the aircraft relative to the theoretical trajectory on a traffic way.

It applies when the aircraft is in a straight line on an airport traffic way or when it is taking a turn. The object of the device according to the invention is to present, with the aid of the HUD according to one case of realization, a set of ergonomic symbols making it possible to inform the pilot of the deviation between the trajectory of the aircraft and the trajectory that he ought theoretically to follow. This symbology is supplemented with an item of information anticipating this deviation, allowing the pilot to foresee an imminent change of trajectory.

Anticipation of the change of trajectory of the aircraft makes it possible to maintain a zero or quasi-zero deviation during the taxiing phase. Moreover, anticipation makes it possible to drive the aircraft in complete safety, including in poor meteorological conditions.

More precisely, the optoelectronic device according to the invention for aiding the guidance of aircraft applies to aircraft comprising a landing gear and a nose wheel, the aircraft being situated on an airport traffic way.

Advantageously, the device comprises means for calculating a deviation factor for the actual trajectory of said aircraft relative to a theoretical trajectory on said traffic way, means for generating symbols and at least one head-up collimator comprising means for displaying and superimposing said symbols on the outside landscape.

Advantageously, the deviation factor is calculated on the basis of a first angle (PÂ'G) determined by the vertex of a triangle defined by a first point (A'), arising from the projection of the central point of the landing gear on the actual trajectory, a second point, called the guidance point (G), situated between the projection of the point of the nose wheel (A) of the aircraft and the projection of the central point of the main landing gear on the actual trajectory and a third point (P), defined by the projection of the guidance point on the theoretical trajectory.

Advantageously, the means for generating symbols generate a symbol representing said deviation factor, so as to be superimposed on said traffic way.

The device according to the invention is rendered active or passive by a pilot control. This control can be of the mechanical actuator type or a digital control. In another embodiment, it can be triggered as active or passive automatically.

Advantageously, anticipation information is calculated on the basis of a second angle (TÂ'T') determined by the vertex of a triangle comprising a first point, called the anticipation point (T), situated between the point of the nose wheel (A) and the guidance point (G) and a second point (T') obtained by projection of the anticipation point (T) on the theoretical trajectory and finally a third point, the vertex (A'), defined by the projection of the central point of the main landing gear on the actual trajectory.

Advantageously, the means for generating symbols generate a signal representing said anticipation information, so as to be superimposed on said traffic way.

Advantageously, the display symbol representing the deviation factor is a diamond moving laterally.

Advantageously, the display symbol representing the deviation factor is a circle comprising three axial segments, said circle moving laterally.

Advantageously, the central position on the display is referenced by a fixed marker corresponding to a zero deviation between the actual trajectory and the theoretical trajectory.

Advantageously, the central marker corresponding to a zero deviation between the actual trajectory and the theoretical trajectory is a rectangle or a square.

Advantageously, the signal, representing the anticipation information, is the blinking of a symbol, said blinking being triggered when the second angle (TÂ'T') exceeds a predefined threshold.

Advantageously, the blinking symbol is the symbol representing the deviation factor or the fixed marker.

Advantageously, the guidance point (G), on wide-body craft, of the A380 or B747 type, is situated at a distance from the nose wheel (A) equivalent to a third of the distance between the nose wheel and the center of the main gear of the aircraft (A').

Advantageously, the guidance point (G), on narrow-body craft, of the A320 type, is situated on nose wheel (A).

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The objective of the device according to the invention is to determine a simple criterion for the deviation between the trajectory followed by the aircraft and the theoretical trajectory. The theoretical trajectory is defined by the curve centered on the runway.

The definition of a reference point, called the guidance point in what follows, situated on the main axis of the aircraft is required by the pilot so that the latter taxis constantly over the runway. For example, for medium-size aircraft, of A320 type, the guidance point can be the nose wheel, the latter being the aircraft's most advanced wheel. In this case, the pilot guides the aircraft on the airport traffic ways, in such a way that the nose wheel remains constantly above the middle of the runway.

The device according to the invention consists in providing the pilot with a symbology representing, in this example, the deviation between the nose wheel and the center of the runway.

Having regard to the recommendations of annex 14 of the International Civil Aviation Organization, called the ICAO, the definition of the airport runway widths makes it possible to choose the nose wheel, for small and/or medium-size aircraft, as guidance reference if the latter is constantly positioned during the maneuver above the central marks of the runways.

On the other hand, the case of aircraft of wide-bodied type, such as the A380 or the B747, does not make it possible to choose the point of the nose wheel as guidance point. The very wide span of the landing gear is at risk of leaving the runway when negotiating a turn.

Figure 1:
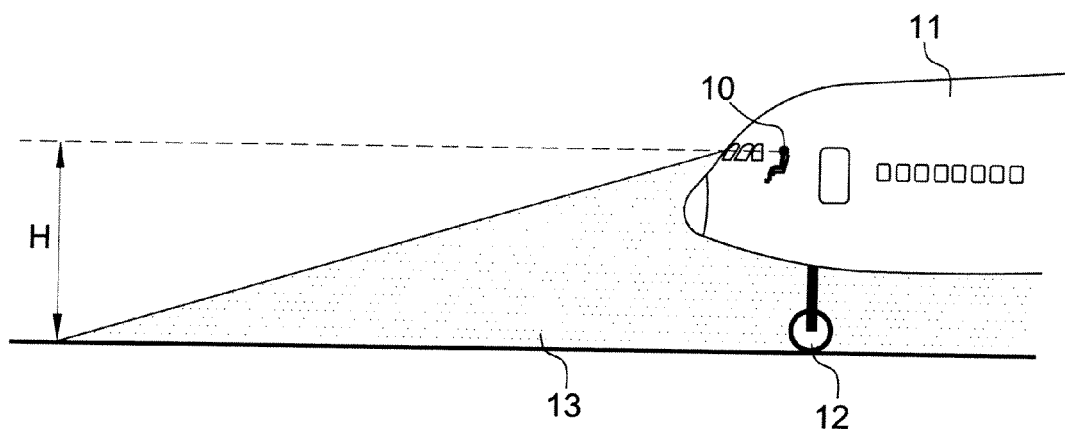
FIG. 1 represents a view of the front of an aircraft with its non-visibility zone.
Figure 2:
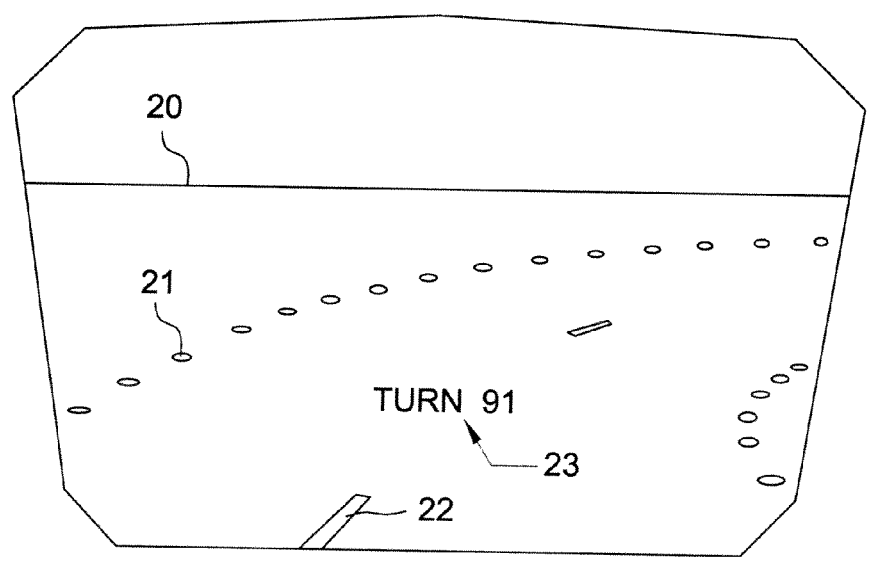
FIG. 2 represents a symbology displayed in a collimator according to the prior art.
Figure 3A:
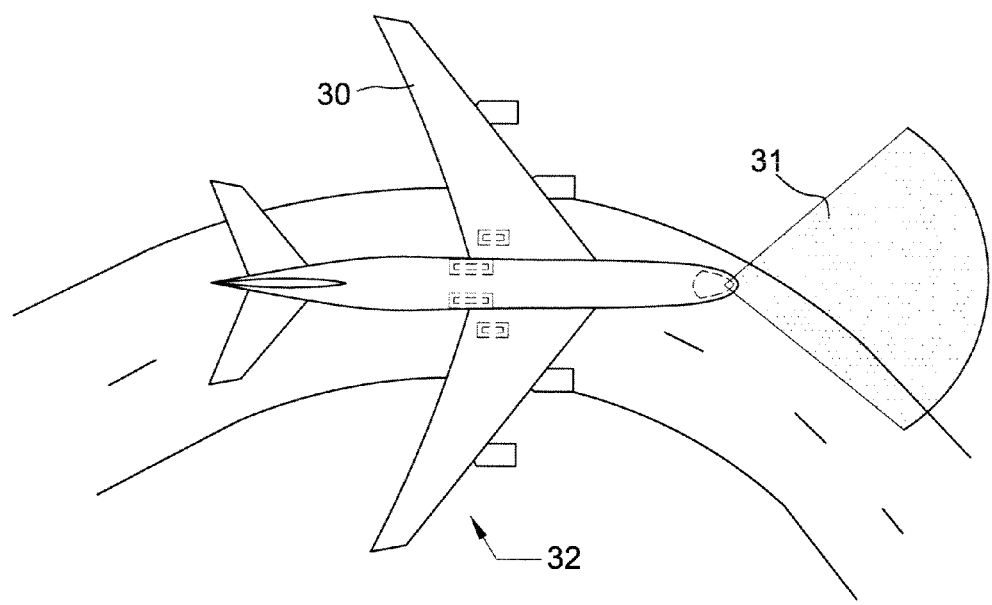
FIG. 3*a* represents a view from above of the aircraft tackling a turn on a traffic way.
Figure 3B:
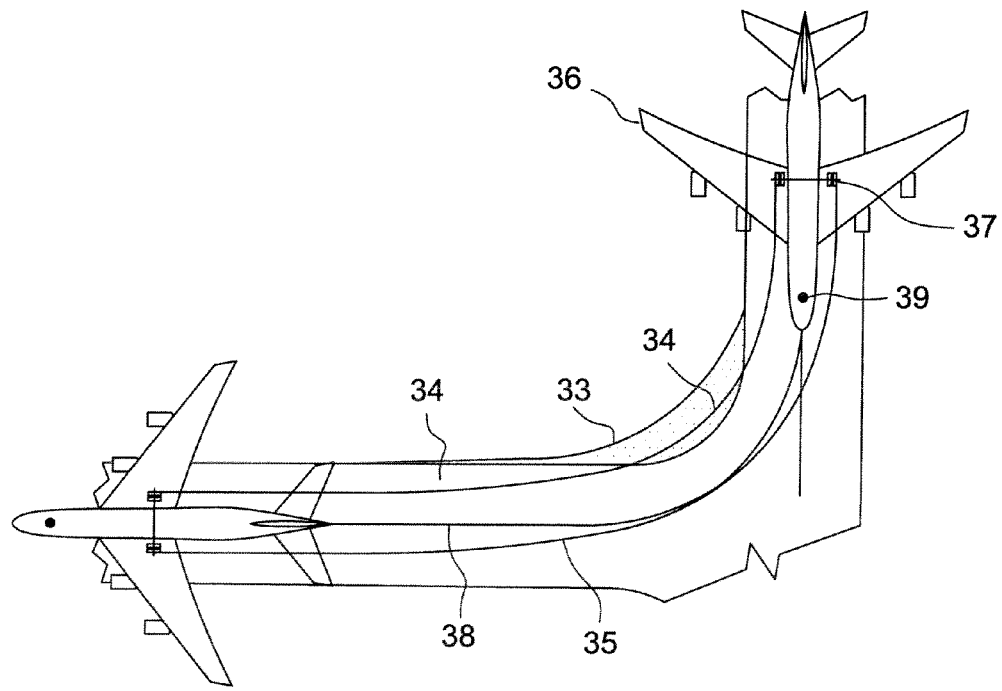
FIG. 3*b* represents the trajectory of the aircraft when the nose wheel is chosen as guidance point.

FIG. 3*b* represents the trajectory of an aircraft 36, of the A380 type. Said aircraft is represented in a turn, of an airport traffic way. On the ground, the trajectory 38, of the nose wheel 39, as well as two trajectories 34, 35, respectively of the wheels, situated at the ends of the landing gear 37, are represented. FIG. 3*b* represents a case where the point of the nose wheel is chosen as reference to guide the aircraft. In this case, the trajectory 38, represents the projection of the nose wheel 39 on the runway when the airplane follows the theoretical trajectory. It is noted, additionally, that one of the two parallel trajectories, formed by the wheels at the ends of the main gear 37, leaves the runway in the zone 33. The trajectory of the aircraft cannot be calculated on the basis of the nose wheel without a risk that the main gear will go off the runway.

A certain number of points, situated at the rear of the nose wheel can constitute a guidance reference. These points are chosen in such a way that the main landing gear does not leave the runway during the whole of the maneuver.

These points, situated on the main axis of the aircraft, lie between the nose wheel and the main gear of the aircraft. The main gear is the gear of the aircraft having the largest span.

The trace of one of these points is then compared with the curve centered on the runway, called the theoretical trajectory.

The device according to the invention introduces a point of the aircraft, called the guidance point, denoted G, making it possible to provide a simple criterion for the deviation between the two trajectories, called the deviation factor.

This point is chosen as guidance reference, in such a way that the trajectory of the aircraft on the runway does not allow the main landing gear to leave the runway.

The calculation of the deviation factor is calculated on the basis of the position of the point G on the runway, with respect to the curve centered on the runway. This deviation factor makes it possible to provide the pilot with a guidance control. This control is calculated on the basis of the calculation means of the device.

A representation, in the form of a particular symbology, then allows the pilot to observe this deviation with the aid of the head-up collimator. In particular, this dedicated symbology allows the pilot, if required, to actuate a control to correct the trajectory of the aircraft on the runway.

The pilot can correct the heading of the aircraft simply by a guidance action with the aid of the symbol representing this deviation factor.

Figure 4:
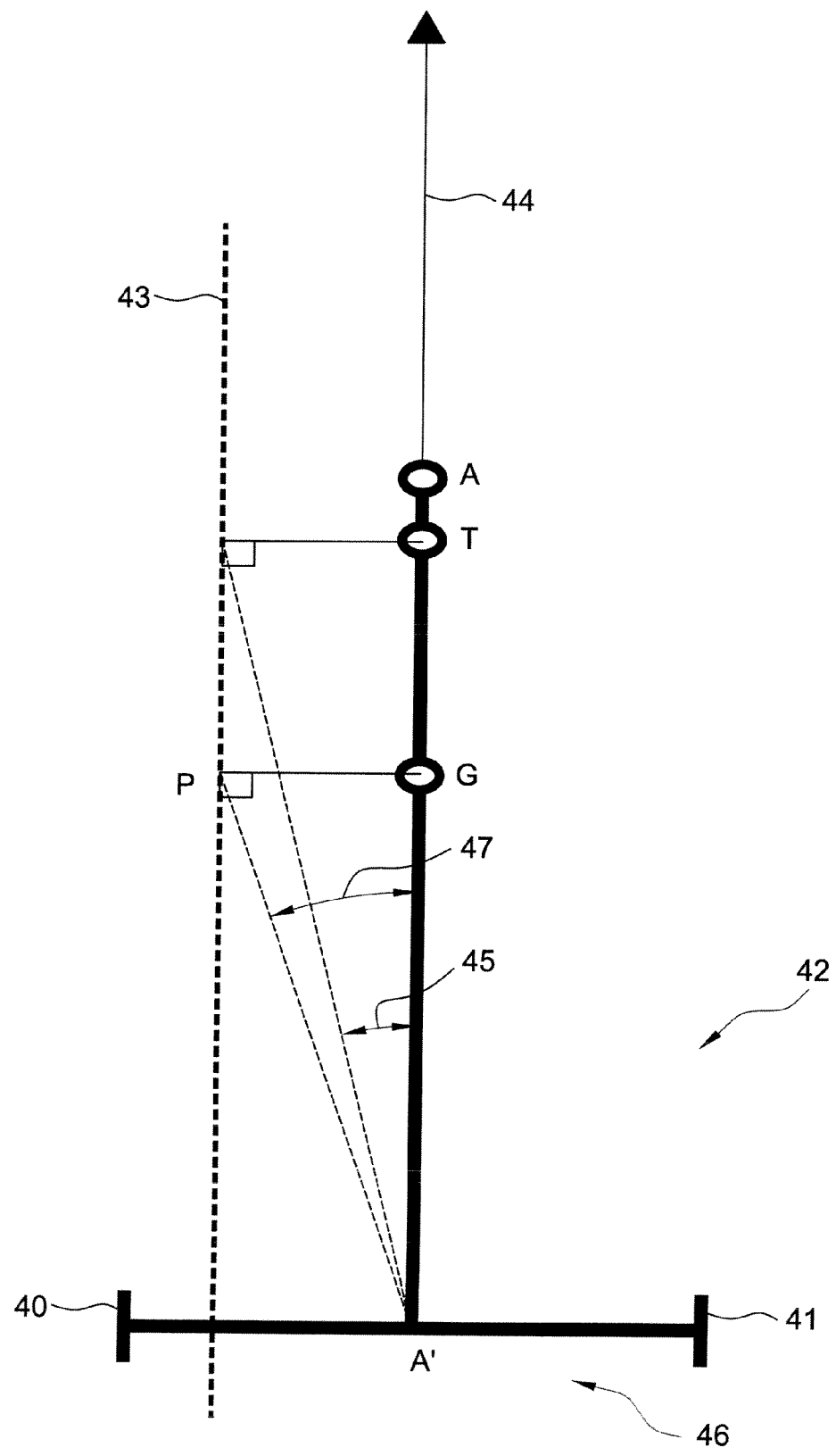
FIG. 4 represents the simplified aircraft, its heading and the theoretical trajectory, when the aircraft is on a straight line.

As regards the calculation of the deviation factor, FIG. 4 represents a drawing of the simplified aircraft whose main characteristics are projected flat on the plane of the ground. The reduced representation of the aircraft comprises the main landing gear 46, the main gear of the aircraft being the gear having the largest span. The point A represents the nose wheel of the aircraft or else the barycenter of the front wheels of the aircraft in the case where there are several. The landing gear 46 comprises two sets of wheels 40, 41 placed at the ends of the main gear. The wheels 40 and 41 are the wheels furthest from the main axis of the aircraft. The center of the gear A' is situated at the intersection of the main landing gear and of the main axis of the aircraft, it is more precisely situated in the middle of the main landing gear. The distance AA' then represents the distance between the center of the landing gear and the nose wheel. The aircraft follows a heading 44. It is shifted from the theoretical trajectory 43 which is parallel to its own trajectory.

The point G is fixed for a given aircraft type and is always situated on the axis AA'. Generally, it is preferable to choose a point G sufficiently close to the nose wheel so as not to deviate overly from the theoretical trajectory in turns. The nose wheel is designated in FIG. 4 by point A. Preferably, for aircraft of the wide-body type, the point G is situated in the first half of the segment AA', that is to say in the part closest to the point A. More precisely, it is preferable to choose the point G in the first third of the segment AA'. This choice allows better piloting comfort and increased anticipation of the guidance decisions.

The guidance point G being, once and for all, determined for a category of aircraft, the computer knows, at any moment, the coordinates, in the reference frame of the airport, of the guidance point. The knowledge of the coordinates of the point G, in the reference frame of the airport, is based on the positioning and heading information provided by the aircraft's navigation system.

The point arising from the projection of G on the theoretical trajectory is denoted P, this trajectory being parallel to the trajectory of the aircraft, in the example of FIG. 4. The theoretical trajectory is known by the computer, since it can be predefined as a function of the characteristics of the airport. The angle 45 PÂ'G represents the change of heading required to be carried out by the aircraft to rejoin the theoretical trajectory. The device according to the invention consists in playing back to the pilot a representation, by way of a symbol, denoted the deviation factor, representative of a representation of the angular deviation.

The displacement of the deviation factor, displayed by the HUD, is not necessarily in accordance with the actual angular deviation between the trajectory of the aircraft and the theoretical trajectory. The deviation factor is, generally, filtered and smoothed for the comfort of the pilot. The filtering and smoothing of the displacement of the symbol representing the deviation factor on the viewing screen are, preferably, chosen so as to alleviate the rates of displacements of the aircraft and the trajectory variations due to the maneuvering of the nose wheel.

The calculation of the deviation factor, in the case where the aircraft re-enters a turn, is similar to the case of a rectilinear trajectory. It is a more critical case given that the pilot's actual-time action is indispensable for guiding the airplane in the curve.

Figure 5:
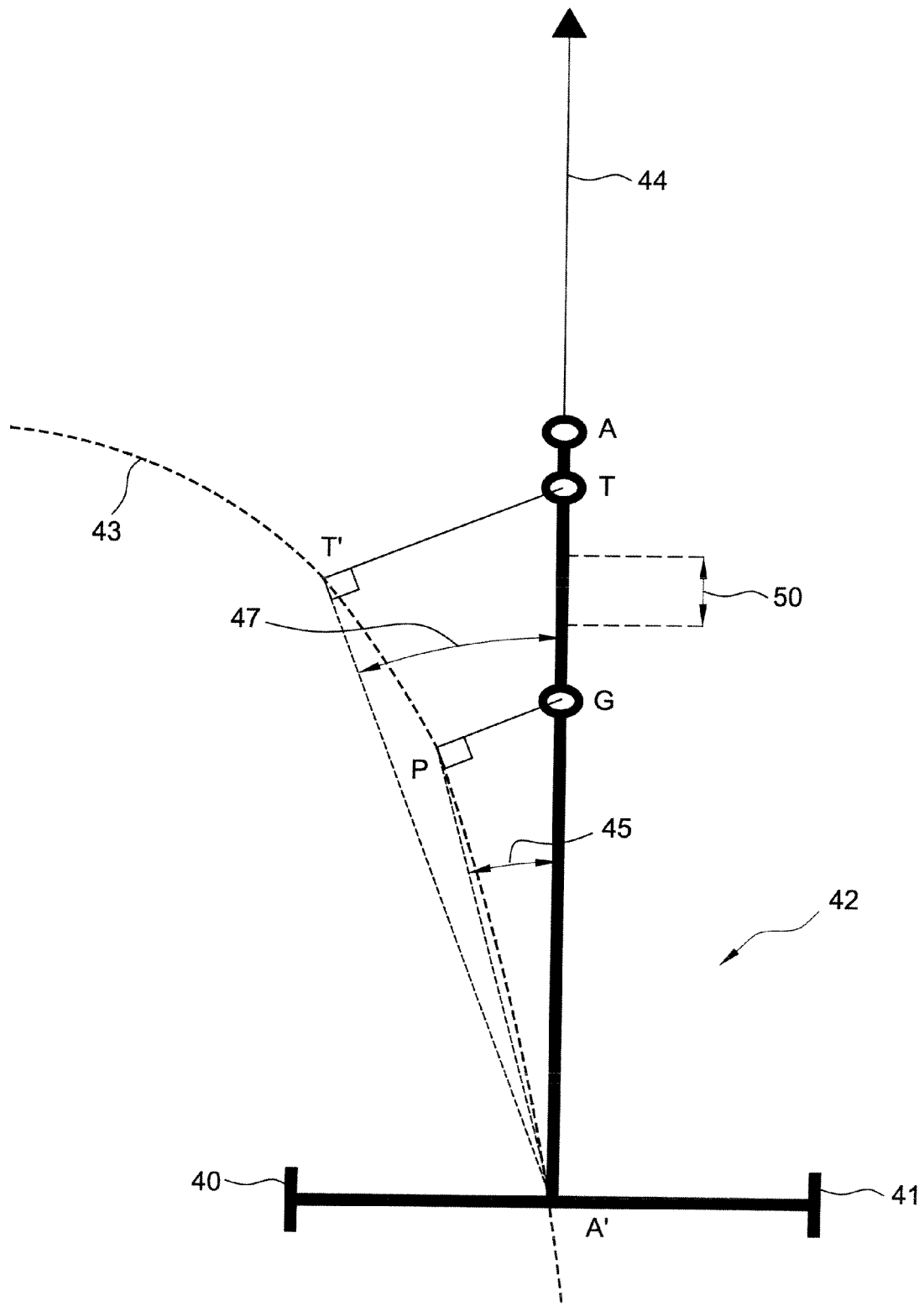
FIG. 5 represents the simplified aircraft, its heading and the theoretical trajectory, when the aircraft is in a turn.

FIG. 5 represents a curved trajectory 43 such as this, representing the curvature of a turn of an airport traffic way. The projection P, of the point G, on the theoretical trajectory 43, forms an angle PÂ'G 45. In the same manner as in a straight line, a deviation factor is deduced from the angular deviation between the trajectory of the aircraft and the theoretical trajectory. This deviation factor is represented by a symbol allowing the pilot to ascertain the guidance control to be performed.

As regards the display of the deviation, it is beneficial to represent in the head-up sight an ergonomic symbology. This symbology represents, to within the smoothing and filtering, the angular deviation between the actual trajectory and the theoretical trajectory.

For the comfort of the pilot, a filtering and a smoothing of the displacement of the symbol are applied. For example a deviation of 1° between the actual trajectory and the theoretical trajectory can be represented by an expanded lateral scale. As the rate of displacement of the symbol is not necessarily linear in relation to the rate of displacement of the aircraft.

Figure 6A:
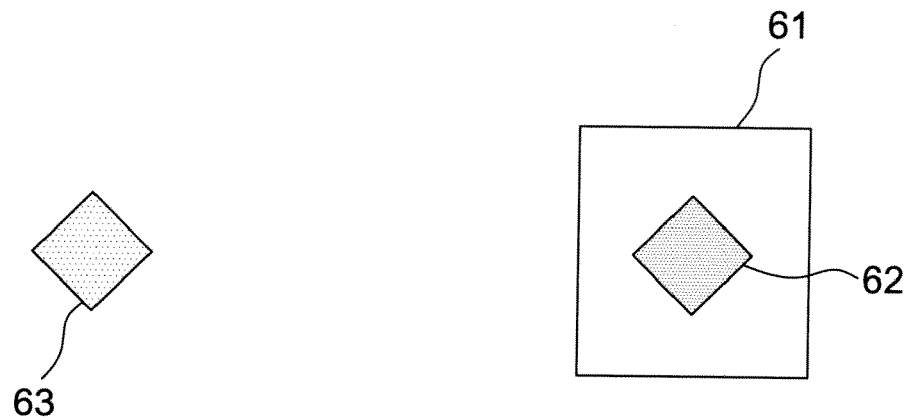
FIGS. 6*a* and 6*b* represent two examples of symbols of the deviation factor.

FIG. 6a represents an exemplary symbol of the deviation factor representing a deviation in the heading of the aircraft with the theoretical trajectory. The symbol is a lozenge, whose shape is a diamond. Its nominal position is obtained for a position of the lozenge 62 centered in a square 61 fixed on the viewing screen. In another case of realization the square can be a rectangle. This position corresponds to the case where no deviation is charted between the actual trajectory and the theoretical trajectory. When a deviation exists between the actual trajectory and the theoretical trajectory, as illustrated in FIGS. 4 and 5, the position of the lozenge 63 slides laterally towards the side where the aircraft drifts from the theoretical trajectory. In this case, the aircraft is symbolized by the square, and the center of the runway by the lozenge. Another case of realization is to reverse the direction of displacement of the lozenge with respect to the direction of drift of the airplane. In the latter case, the aircraft is symbolized by the lozenge and the center of the runway is symbolized by the square.

When the aircraft drift occurs with respect to the theoretical trajectory, the lozenge leaves its initial position, that is to say the reference square. This indication allows the pilot to act accordingly and to restore the heading of the aircraft towards the theoretical heading with the aid of a mechanical actuator such as a handle with load take-up. The pilot having modified his trajectory, the calculation of the angle 45 is done in actual time by the computer and in a repetitive manner slaved by the actions of the pilot.

Figure 6B:
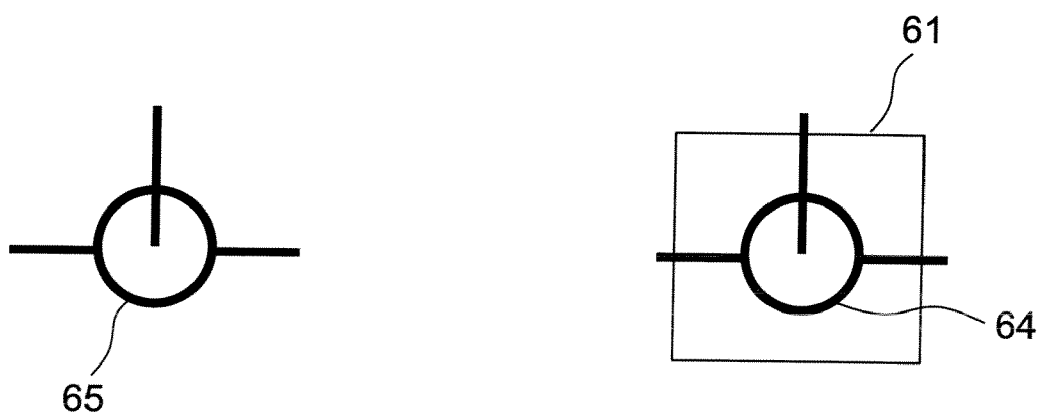

FIG. 6b represents an example of a second symbol 64 of the deviation factor. The latter is a circle and three straight line segments starting from the center of the circle. This symbol represents a drawing of the aircraft seen end-on. The displacement mechanism for this symbol is identical to that, described above, corresponding to the lozenge. In the same manner as previously, its position 65 represents a deviation between the actual trajectory of the aircraft and the theoretical trajectory.

Thus, after a restoral of the aircraft, by pilot action, towards the ideal heading, the lozenge 63 or the symbol 64 will slide towards its origin position 62.

Depending on the climatic and traffic flow conditions, the device according to the invention introduces a viewing signal to the pilot enabling him to anticipate the decisions.

FIG. 5 represents, on the main axis of the aircraft, a point T, called the anticipation point, situated between the points A and G. The position of this point is preferably chosen close to the point A. The point T' arising from the projection of T on the theoretical trajectory is considered. The angle 47 formed by TÂ'T' represents the anticipation information.

In another case of realization, the anticipation point can be situated at the front of the nose wheel, even away from the aircraft. The calculation of the angle TÂ'T' being independent of whether the point T belongs to the aircraft, given that a reference point is involved.

If the actual trajectory of the aircraft deviates only slightly or not at all from the theoretical trajectory, the angle 47 does not exceed a maximum value below which no visual signal is displayed on the pilot's viewing screen. If the actual trajectory of the aircraft deviates beyond a reference value of the angle 47, then a visual signal is displayed and informs the pilot on the viewing screen that the aircraft will soon deviate from the theoretical trajectory. The pilot has the possibility of anticipating the actions to be undertaken to correct the trajectory of the aircraft.

In a first case of realization, the signal corresponding to the anticipation information, presented in visual form to the pilot, can be the blinking of the square comprising the symbol of the deviation factor in its initial position.

In a second case of realization, the signal, presented in visual form to the pilot, can be the blinking of the symbol of the deviation factor whatever its lateral position.

In a third case of realization, the signal, presented in audible form to the pilot, can be an audible sound.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An optoelectronic device for aiding a guidance of aircraft, said aircraft comprising a landing gear and a nose wheel, the aircraft being situatable on an airport traffic way, said device comprising:
   means for calculating a deviation factor for an actual trajectory of said aircraft relative to a theoretical trajectory on said traffic way,
   means for generating symbols and at least one head-up collimator comprising means for displaying and superimposing said symbols on an outside landscape,
   wherein the deviation factor is calculated based on a first angle PÂ'G determined by a vertex of a triangle defined by
      a first point A' arising from a projection of a central point of the landing gear on the actual trajectory,
      a second point, called a guidance point G, situated between a projection of a point of the nose wheel of the aircraft and the projection of the central point of a main landing gear on the actual trajectory and
      a third point P, defined by the projection of the guidance point on the theoretical trajectory and that the means for generating symbols generate a symbol representing said deviation factor, so as to be superimposed on said traffic way.

2. The optoelectronic device as claimed in claim 1, wherein anticipation information is calculated based on a second angle TÂ'T' determined by a vertex of a triangle comprising a first point, called an anticipation point T, situated between the point of the nose wheel and the guidance point G and a second point T' obtained by a projection of the anticipation point T on the theoretical trajectory and finally a third point, the vertex A', defined by the projection of the central point of the main landing gear on the actual trajectory and that the means for generating symbols generate a signal representing said anticipation information, so as to be superimposed on said traffic way.

3. The optoelectronic device as claimed in claim 1, wherein the displayed symbol, representing the deviation factor, moves laterally as a function of the value of the first angle PÂ'G, the position of the symbol corresponding to a zero deviation between the actual trajectory and the theoretical trajectory being referenced by a fixed marker.

4. The optoelectronic device as claimed in claim 3, wherein the display symbol representing the deviation factor is a diamond.

5. The optoelectronic device as claimed in claim 3, wherein the display symbol representing the deviation factor is a circle comprising three axial segments.

6. The optoelectronic device as claimed in claim 3, wherein the marker corresponding to a zero deviation between the actual trajectory and the theoretical trajectory is a rectangle.

7. The optoelectronic device as claimed in claim 2, wherein the signal, representing the anticipation information, is the blinking of a symbol, said blinking being triggered when the second angle TÂ'T' exceeds a predefined threshold.

8. The optoelectronic device as claimed in claim 7, wherein the blinking symbol is the symbol representing the deviation factor.

9. The optoelectronic device as claimed in claim 7, wherein the blinking symbol is the fixed rectangle on the screen, this symbol being associated with the symbol of the deviation factor.

10. The optoelectronic device as claimed in claim 1, wherein the guidance point G, on wide-body craft, of the A380 or B747 type, is situated at a distance from the nose wheel equivalent to a third of the distance between the nose wheel and the center of the main gear of the aircraft A'.

11. The optoelectronic device as claimed in claim 10, wherein the anticipation point T, on wide-body craft, of the A380 or B747 type, is situated at the level of the nose wheel.

12. The optoelectronic device as claimed in claim 1, wherein the guidance point G, on narrow-body craft, of the A320 type, is situated at the level of the nose wheel.

13. The optoelectronic device as claimed in claim 2, wherein the guidance point G, on wide-body craft, of the A380 or B747 type, is situated at a distance from the nose wheel equivalent to a third of the distance between the nose wheel and the center of the main gear of the aircraft A'.

14. The optoelectronic device as claimed in claim 3, wherein the guidance point G, on wide-body craft, of the A380 or B747 type, is situated at a distance from the nose wheel equivalent to a third of the distance between the nose wheel and the center of the main gear of the aircraft A'.

15. The optoelectronic device as claimed in claim 4, wherein the guidance point G, on wide-body craft, of the A380 or B747 type, is situated at a distance from the nose wheel equivalent to a third of the distance between the nose wheel and the center of the main gear of the aircraft A'.

16. The optoelectronic device as claimed in claim 5, wherein the guidance point G, on wide-body craft, of the A380 or B747 type, is situated at a distance from the nose wheel equivalent to a third of the distance between the nose wheel and the center of the main gear of the aircraft A'.

17. The optoelectronic device as claimed in claim 6, wherein the guidance point G, on wide-body craft, of the A380 or B747 type, is situated at a distance from the nose wheel equivalent to a third of the distance between the nose wheel and the center of the main gear of the aircraft A'.

18. The optoelectronic device as claimed in claim 7, wherein the guidance point G, on wide-body craft, of the A380 or B747 type, is situated at a distance from the nose wheel equivalent to a third of the distance between the nose wheel and the center of the main gear of the aircraft A'.

19. The optoelectronic device as claimed in claim 8, wherein the guidance point G, on wide-body craft, of the A380 or B747 type, is situated at a distance from the nose wheel equivalent to a third of the distance between the nose wheel and the center of the main gear of the aircraft A'.

20. The optoelectronic device as claimed in claim 9, wherein the guidance point G, on wide-body craft, of the A380 or B747 type, is situated at a distance from the nose wheel equivalent to a third of the distance between the nose wheel and the center of the main gear of the aircraft A'.

* * * * *